United States Patent
Tang

(10) Patent No.: US 9,544,576 B2
(45) Date of Patent: *Jan. 10, 2017

(54) 3D PHOTO CREATION SYSTEM AND METHOD

(71) Applicant: CITY IMAGE TECHNOLOGY LTD., Hong Kong (HK)

(72) Inventor: Sy Sen Tang, Hong Kong (HK)

(73) Assignee: CITY IMAGE TECHNOLOGY LTD., Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,208

(22) Filed: Jan. 14, 2016

(65) Prior Publication Data
US 2016/0134859 A1 May 12, 2016

Related U.S. Application Data

(63) Continuation of application No. 14/172,888, filed on Feb. 4, 2014, now Pat. No. 9,270,977.
(Continued)

(51) Int. Cl.
*G06K 9/00* (2006.01)
*H04N 13/02* (2006.01)
(Continued)

(52) U.S. Cl.
CPC ........ *H04N 13/0271* (2013.01); *G06K 9/4661* (2013.01); *G06K 9/6215* (2013.01); *H04N 13/0011* (2013.01); *H04N 13/0022* (2013.01); *H04N 13/0282* (2013.01); *H04N 13/0292* (2013.01); *H04N 2013/0081* (2013.01)

(58) Field of Classification Search
None
See application file for complete search history.

(56) References Cited

U.S. PATENT DOCUMENTS 8,248,410 B2 * 8/2012 Tan ................... G06T 7/0071
345/420
9,270,977 B2 * 2/2016 Tang ................ H04N 13/0011
(Continued)

OTHER PUBLICATIONS

O. Grau and V. Vinayagamoorthy, "Stereoscopic 3D Sports Content without Stereo Rigs," in SMPTE Motion Imaging Journal, vol. 119, No. 7, pp. 51-55, Oct. 2010.*

*Primary Examiner* — Andrae S Allison

(57) ABSTRACT

The present application is directed to a 3D photo creation system and method, wherein the 3D photo creation system including: a stereo image input module configured to input a stereo image; wherein the stereo image comprises a left eye image and a right eye image; a depth estimation module configured to estimate a depth information of the stereo image and create a depthmap; a multi-view angle image reconstructing module configured to create a multi-view angle image according to the depthmap and the stereo image; and an image spaced scanning module configured to adjust the multi-view angle image and form a mixed image. The system and method outstandingly simplified the process of 3D photo creation and enhanced the quality of 3D photo. The system and method can be widely used in various theme parks, tourists attraction spots and photo galleries and bring about pleasure to more consumers with the 3D photos.

15 Claims, 6 Drawing Sheets

Related U.S. Application Data

(60) Provisional application No. 61/761,250, filed on Feb. 6, 2013.

(51) Int. Cl.
  *H04N 13/00* (2006.01)
  *G06K 9/46* (2006.01)
  *G06K 9/62* (2006.01)

(56) References Cited

U.S. PATENT DOCUMENTS

| | | | | |
|---|---|---|---|---|
| 2002/0061131 A1* | 5/2002 | Sawhney | ............. | G06T 7/0022 382/154 |
| 2007/0024614 A1* | 2/2007 | Tam | ............. | G06T 7/0067 345/419 |
| 2008/0232716 A1* | 9/2008 | Plagne | ............. | G06T 7/0051 382/285 |
| 2008/0247670 A1* | 10/2008 | Tam | ............. | G06T 7/0051 382/298 |
| 2009/0324059 A1* | 12/2009 | Boughorbel | ............. | G06T 7/0065 382/154 |
| 2010/0183236 A1* | 7/2010 | Kang | ............. | G06T 5/002 382/260 |
| 2011/0254834 A1* | 10/2011 | Jeon | ............. | G02B 27/26 345/419 |
| 2011/0274366 A1* | 11/2011 | Tardif | ............. | G06T 5/002 382/260 |
| 2012/0237114 A1* | 9/2012 | Park | ............. | G06T 7/0071 382/154 |
| 2013/0187910 A1* | 7/2013 | Raymond | ............. | G09G 5/14 345/419 |

* cited by examiner

3D PHOTO CREATION SYSTEM AND METHOD

CROSS-REFERENCE TO RELATED APPLICATIONS

This application is a Continuation Application of U.S. patent application Ser. No. 14/172,888 filed on Feb. 4, 2014 which claims the benefit of U.S. Provisional Patent Application No. 61/761,250 filed on Feb. 6, 2013, the contents of which are hereby incorporated by reference.

FIELD OF THE TECHNOLOGY

The present application is directed to a photo processing system and method. Specifically, it relates to a 3D photo processing system and method.

BACKGROUND 3D photos are commonly created with the application of the lenticular technique. The transparent lens of the lenticular lens is an array of magnifying lenses. Such magnifying lenses array is designed in a way such that when being perceived at slightly different angles, different images are magnified. In order to create a 3D photo, multi-view angle images, such as in 12 or more multi-view angle images, must first be created. Subsequently, the multi-view angle images will be combined into a mixed image. The combination of multi-view angle images is a process of acquiring, from the multi-view angle images, suitable pixels for combining into and forming a new image. The new image comprises the multi-view angle information of the original image. The transparent lens of the lenticular lens is used to reveal the multi-view viewing angles from different viewing angles. Finally, the left and right eyes of the viewer can see different images through observing from the lenticular lens which produces a 3D effect.

Presently, different methods of creating 3D photos exist. In particular, the most common method is to convert 2D image into multi-view angle images using manual operation. Such method requires a processing time of several hours to several days. Normally, the operator is required to create a mask for extracting a subject from the target image. Then, the operator needs to assign a depth information to the mask based on his own judgment. The depth information is an independent grayscale image possessing the same dimensions as the original 2D image. The grayscale image applies the various shades of gray color to indicate the depth of every part of the image. The manually created depth information leads the computer to shift the pixel of the original 2D image for forming a new view angle map. The depthmap can produce a conspicuous 3D visual effect.

Another method is to photo-shoot the subject from multi-view angles. However, such method is not feasible when applying to subject in motion. Such method requires the set up of one or multiple cameras to capture the multi-view angle images. The image capturing device must be positioned with scrutiny so that the view angle of the image outputted would not be overly wide.

The multi-view angle image is used to reconstruct the mixed image. The majority of systems construct the mixed image directly from the data obtained in the multi-view angle images. Since the final image is a sub-sample of each multi-view angle image, the image obtained from such method cannot preserve the quality of the original image.

Based on the above, current 3D photo creation method and system contain deficiencies such as long processing time and poor photo quality.

SUMMARY

The present patent application is directed to a 3D photo creation system and method. In one aspect, the 3D photo creation system includes:
(a) a stereo image input module configured to input a stereo image; wherein the stereo image comprises a left eye image and a right eye image;
(b) a depth estimation module configured to estimate a depth information of the stereo image and create a depthmap;
(c) a multi-view angle image reconstructing module configured to create a multi-view angle image according to the depthmap and the stereo image; and
(d) an image spaced scanning module configured to adjust the multi-view angle image and form a mixed image.

The depth estimation module may include:
(b1) a pixel matching module configured to compare the left eye image and the right eye image of the stereo image and find a matching pixel between the left eye image and the right eye image, and find an optical flow of the pixel according to an optical flow constraint formula;
(b2) a depth information confirmation module configured to find a pixel shifting according to the optical flow of the left eye image and the right eye image to confirm the depth information of the pixel; and
(b3) a depthmap creation module configured to create the depthmap according to the depth information.

The multi-view angle image reconstructing module may include:
(c1) a base image selection module configured to select the left eye image, the right eye image or the left eye image and the right eye image of the stereo image as a base image;
(c2) an image number confirmation module configured to confirm a number and disparity of a required image according to demand;
(c3) a pixel shifting module configured to shift pixels of the base image according to the depthmap to form a new image;
(c4) a hole filling module configured to fill holes formed from a loss of pixels in the new image; and
(c5) a multi-view angle image creation module configured to create the multi-view angle image.

The image spaced scanning module may include:
(d1) an image adjusting module configured to adjust a size of the multi-view angle image;
(d2) a contrast adjusting module configured to adjust a contrast ratio of the adjusted multi-view angle image outputted by the image adjusting module;
(d3) an image interlacing module configured to combine the multi-view angle images after the contrast adjustment into a mixed image; and
(d4) a mixed image output module configured to output the mixed image.

The hole filling module applies the interpolation method to fill the holes formed from the loss of pixels in the new image.

In another aspect, the 3D photo creation method includes the following steps:
S1) inputting a stereo image; wherein the stereo image comprises a left eye image and a right eye image;
S2) estimating a depth information of the stereo image and creating a depthmap;
S3) creating a multi-view angle image according to the depthmap and the stereo image; and S4) adjusting the multi-view angle image to form a mixed image.

The step S2 may include the following steps:

S21) comparing the left eye image and the right eye image of the stereo image and finding a matching pixel between the left eye image and the right eye image, and calculating an optical flow of the pixel according to an optical flow constraint formula;

S22) finding a shifting of the pixel according to the optical flow of the left eye image and the right eye image to confirm the depth information of the pixel; and S23) creating the depthmap according to the depth information.

The step S3 may include:

S31) selecting the left eye image, the right eye image or the left eye image and the right eye image of the stereo image as a base image;

S32) confirming a number and disparity of a required image according to demand;

S33) shifting pixels of the base image according to the depthmap to form a new image;

S34) filling holes formed from a loss of pixels in the new image; and

S35) creating the multi-view angle image.

The step S4 may include:

S41) adjusting a size of the multi-view angle image;

S42) adjusting a contrast ratio of the multi-view angle image adjusted by the step S41;

S43) combining the multi-view angle image after the contrast adjustment and forming a mixed image;

S44) outputting the mixed image.

The step 34 applies interpolation method to fill the holes formed from the loss of pixel in the new image.

BRIEF DESCRIPTION OF THE DRAWINGS

Below is a further description of the present application with reference to the drawings and embodiments, in the drawings.

DETAILED DESCRIPTION

Figure 1:
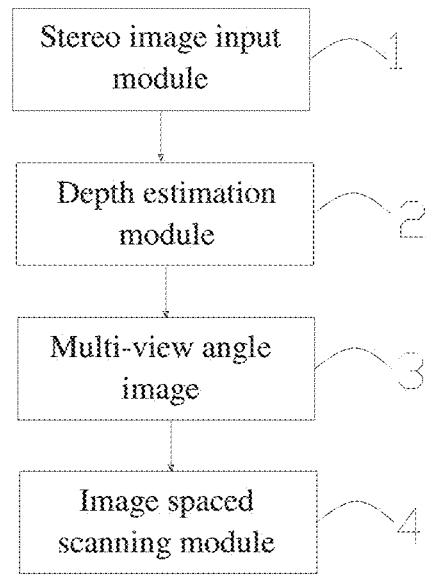
FIG. 1 is a diagram of a 3D photo creation system of the present application.
Figure 2:
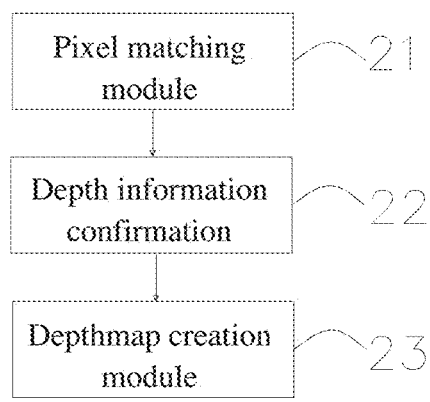
FIG. 2 is a diagram of a depth estimation module in the 3D photo creation system of the present application.
Figure 3:
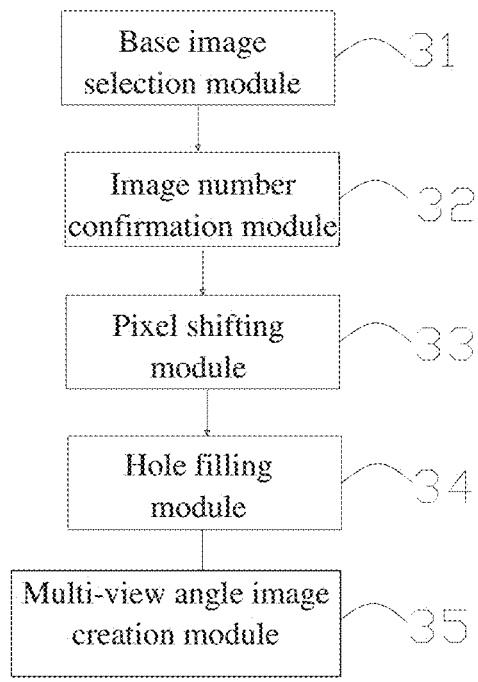
FIG. 3 is a diagram of a multi-view angle image reconstructing module in the 3D photo creation system of the present application.
Figure 4:
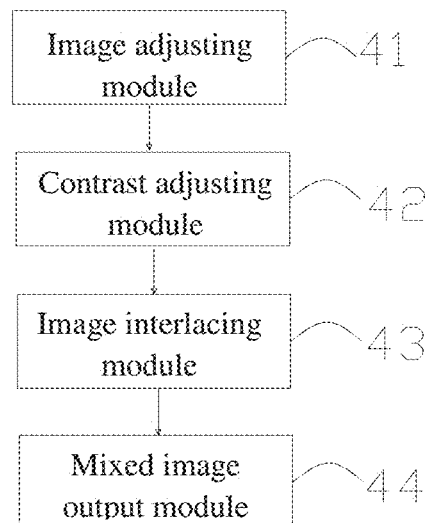
FIG. 4 is a diagram of an image spaced scanning module in the 3D photo creation system of the present application.
Figure 5:
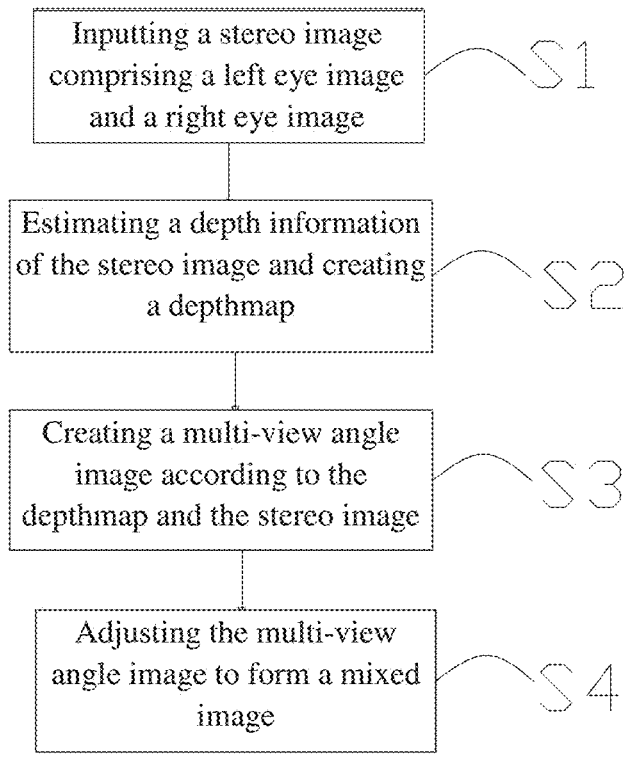
FIG. 5 is a flow chart of the 3D photo creation method of the present application.

In order to have a more lucid understanding on the technical feature, purpose and effect of the present application, a detailed description of the embodiments of the present application with reference to the drawings is hereby provided.

FIGS. 1 to 4 illustrate a diagram of an embodiment of the 3D photo creation system of the present application. Such 3D photo creation system includes a stereo image input module 1, a depth estimation module 2, a multi-view angle image reconstructing module 3 and an image spaced scanning module 4. In particular, the stereo image input module 1 is used to input stereo image. The stereo image includes left eye image and right eye image; the depth estimation module 2 is used to evaluate the depth information of the stereo image and create a depthmap; the multi-view angle image reconstructing module 3 is used to create multi-view angle image according to depthmap and stereo image; the image spaced scanning module 4 is used to adjust the multi-view angle image and form a mixed image.

In the 3D photo creation system of the present application, the depth estimation module 2 further including: a pixel matching module 21, a depth information confirmation module 22 and a depthmap creation module 23. In particular, the pixel matching module 21 is used to compare the left eye image and right eye image of the stereo image and find the matching pixel between the left eye image and the right eye image, and calculate the optical flow of the pixel according to the optical flow constraint formula. In particular, matching pixel refers to the pixel at the same pixel location of the left eye image and right eye image. The depth information confirmation module 22 is used to find the shifted location of the pixel according to the optical flow of the left eye image and right eye image for confirming the depth information of the pixel. The depthmap creation module 23 is used to create depthmap according to the depth information.

In the 3D photo creation system of the present application, the multi-view angle image reconstructing module 3 further includes: a base image selection module 31, an image number confirmation module 32, a pixel shifting module 33, a hole filling module 34 and a multi-view angle image creation module 35. In particular, the base image selection module 31 is used to select the left eye image, right eye image or left eye image and right eye image of the stereo image being the base image. The image number confirmation module 32 is used to confirm the required number and disparity of the images according to demand. The pixel shifting module 33 is used to shift the pixel of the base image according to the depthmap for forming a new image. The hole filling module 34 is used to fill the holes formed from loss of pixels in the new image. The multi-view angle image creation module 35 is used to create multi-view angle images.

In the 3D photo creation system of the present application, the image spaced scanning module 4 further includes: an image adjusting module 41, a contrast adjusting module 42, an image interlacing module 43 and a mixed image output module 44. In particular, the image adjusting module 41 is used to adjust the size of the multi-view angle image. The contrast adjusting module 42 is used to adjust the contrast ratio of the adjusted multi-view angle image as outputted by the image adjusting module. The image interlacing module 43 is used to combine the multi-view angle images after contrast adjustment for forming a mixed image. The mixed image output module 44 is used to output the mixed image.

FIGS. 5 to 8 are flow charts of the 3D photo creation method of the present application, which include the following steps:

S1 inputs a stereo image, the stereo image includes a left eye image and a right eye image;

S2 estimates the depth information of the stereo image and creates a depthmap;
S3 creates a multi-view angle image according to the depthmap and the stereo image;
S4 adjusts the multi-view angle image and forms a mixed image.

In particular, step S2 further includes the following steps:
S21 compares the left eye image and right eye image of the stereo image and finds the matching pixel between the left eye image and the right eye image; and calculates the optical flow according to the optical flow constraint formula.
S22 finds the pixel shifting according to the optical flow of the left eye image and the right eye image for confirming the depth information of the pixel;
S23 creates depthmap according to depth information.

Procedure S3 further includes:
S31 selects the left eye image, right eye image or left eye image and right eye image of the stereo image being the base image;
S32 confirms the required number and disparity of the images according to demand;
S33 forms a new image from shifting the pixel of the base image according to depthmap;
S34 fills the hole formed from loss of pixel in the new image;
S35 creates multi-view angle image.

Step S4 further includes:
S41 adjusts the size of the multi-view angle image;
S42 adjusts the contrast ratio of the multi-view angle image adjusted in step S41;
S43 combines the multi-view angle images after contrast adjustment and forms a mixed image;
S44 outputs the mixed image.

The above introduces the formation of the 3D photo creation system of the present application and the specific steps of the 3D photo creation method of the present application. Below is a description of the working concept of the 3D photo creation system and method of the present application in combination with specific examples. The 3D photo creation system of the present application applies stereo image as input. It will automatically undergo comparison according to the stereo image and then calculates the 3D information (also known as depthmap). Then, a multi-view angle image is created according to the shifting of the pixel of the original input image by the depth information. In order to enhance the quality of the final mixed image, the 3D photo creation system of the present application would adjust the created image for forming a suitable size. Then, the image after adjustment would combine together. Lastly, the mixed image formed can be displayed on a glasses-free 3D display device, or be combined with any lenticular sheet to form a 3D photo.

Figure 9:
FIG. 9 is an illustrative view of a stereo image inputted by the 3D photo creation system of the present application.

In the 3D photo creation system in the present application, the stereo image input module 1 is used to input stereo image. The stereo image is the stereomap, which can produce 3D visual effect. It is an image that can bring about depth sensing experience to the observer through stereo observation with his eyes. Such stereomap can be obtained from one or many techniques. The stereo image can also directly apply 3D image. In the present embodiment, the input of the stereo image is a stereo image comprising left eye image and right eye image, with the specific image as illustrated in FIG. 9.

Figure 6:
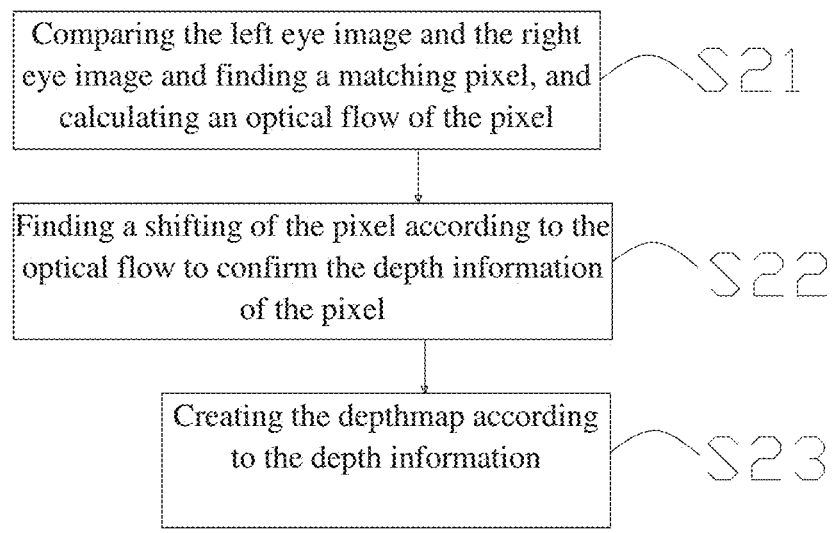
FIG. 6 is a flow chart of procedure S2 in the 3D photo creation method of the present application.

The depth estimation module 2 is used to analyze the depth information of the stereo image inputted by the stereo image input module 1, for reconstructing the multi-view angle image. The depth estimation step is illustrated in FIG. 6. The depth estimation module 2 includes pixel matching module 21, depth information confirmation module 22 and depthmap creation module 23. In particular, pixel matching module 21 is used to compare the left eye image and right eye image of the stereo image as inputted for finding the matching pixel of the two, that is, the pixel at the same pixel location of the left eye image and right eye image. The subject in the left eye image and right eye image of the stereo image exists displacement, also known as disparity. In order to extract the disparity, optical flow and stereo matching as such matching methods would be applied to find the pixel shifting between the left eye image and the right eye image. Optical flow is a pattern of apparent motion of subject, surface or edges in the visual scene caused by the relative motion between an observer (such as glasses and camera) and the scene. Optical flow estimation calculates the optical flow using the optical flow constraint formula. In order to find the matching pixel, image must be compared and the famous optical flow constraint formula be abided:

$$\frac{\partial I}{\partial x}V_x + \frac{\partial I}{\partial y}V_y + \frac{\partial I}{\partial t} = 0$$

Wherein $V_x$, $V_y$ are respectively the x and y components of the velocity or optical flow of $I(x, y, t)$ and $$\frac{\partial I}{\partial x}, \frac{\partial I}{\partial t} \text{ and } \frac{\partial I}{\partial t}$$

are the derivatives of the image at (x, y, t) in the corresponding directions. A coarse-to-fine strategy can be adopted to determine the optical flow of the pixel. There exists different robust methods for enhancing the disparity estimation, such as the "high accuracy optic flow estimation based on a theory for warping."

Figure 10:
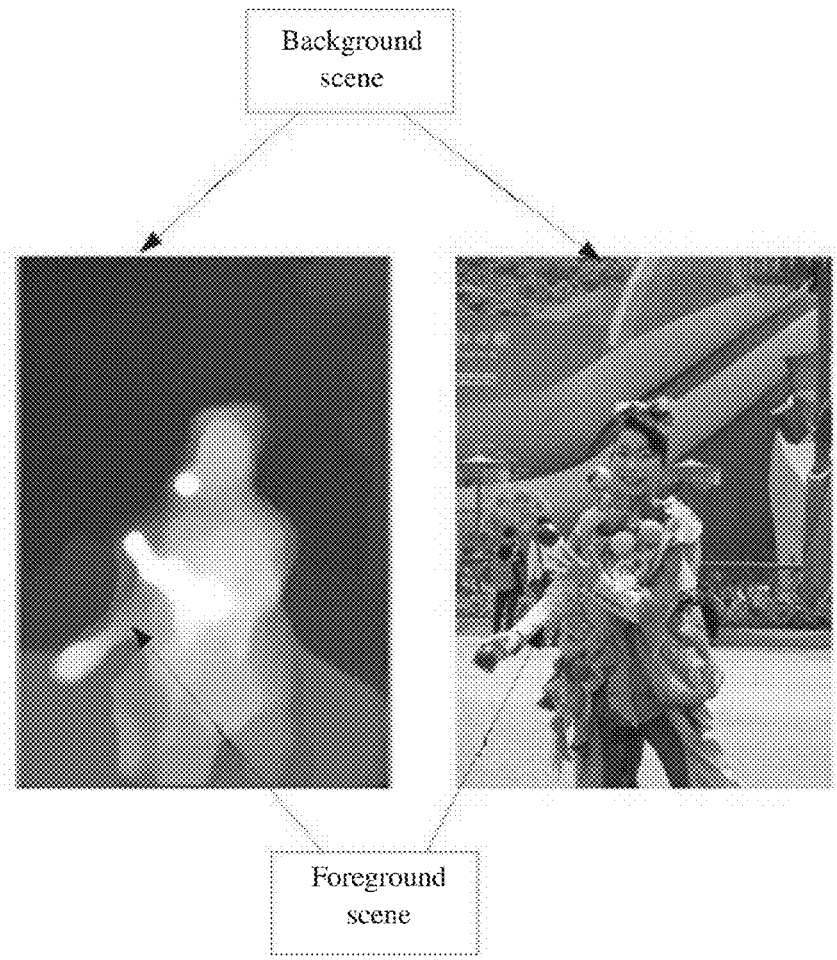
FIG. 10 is an illustrative view of a comparison between a depthmap formed from the 3D photo creation system of the present application and an original image.

After matching the pixel, the depth information can be transmitted from the disparity information and the camera configuration. The displacement of the pixel can indicate the depth formation. Yet, most 3D stereo capturing device convert the camera or lens to a point. In other word, the direction of the optical flow must be considered in the calculation of every depth of the pixel. The depth information confirms module 22 which confirms the depth information of the pixel. The manipulation of the following equation enables the depth information of each pixel to be calculated.

$$\text{maxdisplacement-direction}\sqrt{u^2+v^2}$$

Wherein maxdisplacement is the maximum displacement of the pixel, direction is the direction of the optical flow, u and v are respectively the optical flow vectors of each pixel in the x and y directions. Such depth information can be used to reconstruct the 3D environment (i.e. depthmap). The depthmap is represented by a grey scale image recognized by the computer. Depthmap creation module 23 is used to create depthmap. Normally the depth value of the pixel is 0 to 255. The higher the depth value of the pixel is, the closer the distance with the observer is. In order to enhance the quality of the 3D photo, the 3D photo creation system of the present application separates the foreground scene and background scene in the depthmap. The system uses depth value of the pixel ranging within 99 to 255 to represent foreground scene and uses depth value of the pixel ranging within 0 to 128 to represent background scene. The foreground scene depth information and the background scene depth information possess certain overlapping. In the present embodiment, the overlapping ranges from 99 to 128. The range of overlapping of the foreground scene depth information and the background scene depth information can be adjusted by the user. Such process can increase the contrast between the foreground scene and the background scene. Furthermore, the main subject in the foreground and the depth detail of the background can be enhanced. FIG. 10 is an illustrative view of an image separating the foreground scene and the background scene.

Figure 7:
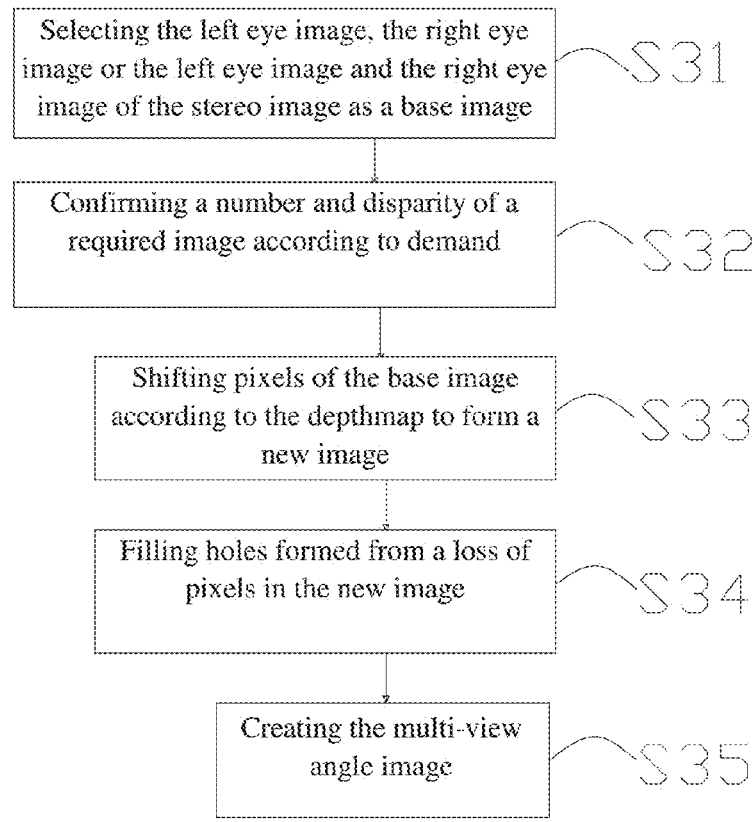
FIG. 7 is a flow chart of procedure S3 in the 3D photo creation method of the present application.

The multi-view angle image reconstructing module 3 is used to reconstruct multi-view angle images, including: the base image selection module 31, image number confirmation module 32, pixel shifting module 33, hole filling module 34 and multi-view angle image creation module 35. The base image selection module 31 can select the left eye image, right eye image or left eye image and right eye image of the stereo image as the base image for producing the multi-view angle image. The multi-view angle image reconstruction process is illustrated in FIG. 7. If a single image is selected, such as the left eye image or the right eye image, then the image created will be the left eye image and right eye image of the selected image. If 2 N+1 images must be created, then the image selected will be the N+1$^{th}$ image. The images created will be the 1 to N images and the N+2 to 2 N+1 images. For example, if 9 images must be created, then the image selected will be the 5$^{th}$ image. The image created will be the 1 to 4 images and the 6 to 9 images. The image number confirmation module 32 is used to confirm the number of image according to need. On the other hand, if two images are selected (left eye image and right eye image) as the base image for creating multi-view angle images, that is, the stereo image is selected as the base image, then the system would use the disparity and the number of image required to determine the location of the two images selected. In the present embodiment, the system would first confirm the number of image required to be created. The number of multi-view angle image is dependent on the LPI (line per inch) of the lenticular lens and DPI (dot per inch) of the printer. The number of multi-view angle image is N=DPI/LPI, wherein DPI is the dot per inch of the printer, LPI is the line per inch of the lenticular lens. For example, each line per inch of the lenticular lens is 50, each dot per inch is 600. The number of image required is 600/50=12. Therefore, 12 images are required to construct a suitable 3D image. The position of the original stereo image is determined by the following equations:

$$\text{original left image position} = \frac{N - \frac{D}{d}}{2}$$

$$\text{original right image position} = \text{left image position} + \frac{D}{d}$$

wherein N is the number of multi-view angle image, D is the disparity of the original stereo image and d is the disparity of each view angle of the multi-view angle image created. The original stereo image will be inserted into a suitable position of the multi-view angle image. The other view angle images will be created from the original stereo image. This method will evenly distribute the multi-view angle images, that is, these images possess similar disparity. Such method can also enhance the quality of the final mixed image.

After determining the number of image required and the location of all image, the system would manipulate the depthmap to create multi-view angle images. The depthmap of the left eye image and right eye image is already formed at the front part. These base images, such as the left eye image or the right eye image will shift the pixel according to their own depthmaps. The pixel shifting module 33 is used to shift the pixel of the base image for forming a new image. Normally, the depth value of the depthmap has the mid-value from 0 to 255,128, which is a converging point of the base image. In order to simulate the left eye image from the base image, the pixel at the depth value ranging within 128 to 255 is shifted to the right side. The pixel at the depth value ranging within 0 to 127 is shifted to the left side. In order to simulate the left eye image from the base image, the pixel at the depth value ranging within 128 to 255 is shifted to the left side. The pixel at the depth value ranging within 0 to 127 is shifted to the right side. From 128 to 255, the greater the depth value of the pixel, the greater the shifting distance of the pixel. From 0 to 127, the smaller the depth value of the pixel, the greater the shifting distance of the pixel. Below is an equation for the pixel shifting.

$$lx = x + \text{parallax}; \quad rx = x - \text{parallax}$$

wherein parallax is a disparity parameter of the depth information of the image, lx is the x-coordinate of the left eye image pixel, rx is the x-coordinate of the right eye image pixel. The pixel at the new left eye image (lx, y) is the pixel at the base image (x, y). The pixel at the new right eye image (rx, y) is the pixel at the base image (x, y). After suitable shifting of the pixel, the left eye image and right eye image will be finally created.

When the system created a new image, the new image will lose some pixels. The process of handling these lost pixels is known as hole filling. Hole filling module 34 is used to fill these holes. These holes produced from the shifting of the pixels can be re-filled by manipulating the neighboring pixels with the method of interpolation, or be re-filled using other suitable methods of hole filling. The formula for calculating the pixel value of the holes using the interpolation method is shown below:

$$\text{length} = endx - startx$$

$$\text{weight} = \frac{(holex - startx)}{\text{length}}$$

$$pixelvalue = $$
$$((\text{source Image}(endx, y) - sourceImage(startx, y)) \times weight +$$
$$sourceImage(startx, y)$$

Wherein startx and endx are the starting and ending positions of the holes in the row, length is length of the holes, holex is x position of the holes, weight is the weight value of the holes and pixelvalue is the pixel value of the holes. After the holes are filled, the view angle image newly created is prepared and the next step can be proceeded. The multi-view angle image creation module 35 can create multi-view angle image according to the original image and the newly created image.

Figure 8:
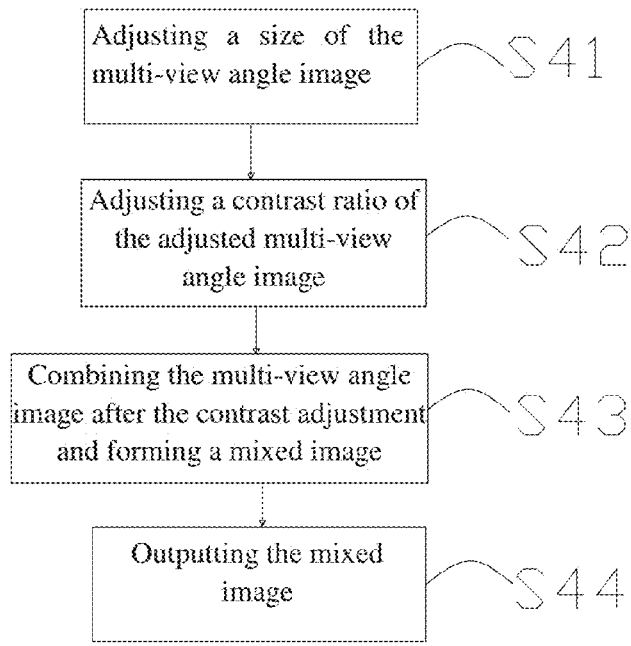
FIG. 8 is a flow chart of procedure S4 in the 3D photo creation method of the present application.
Figure 11:
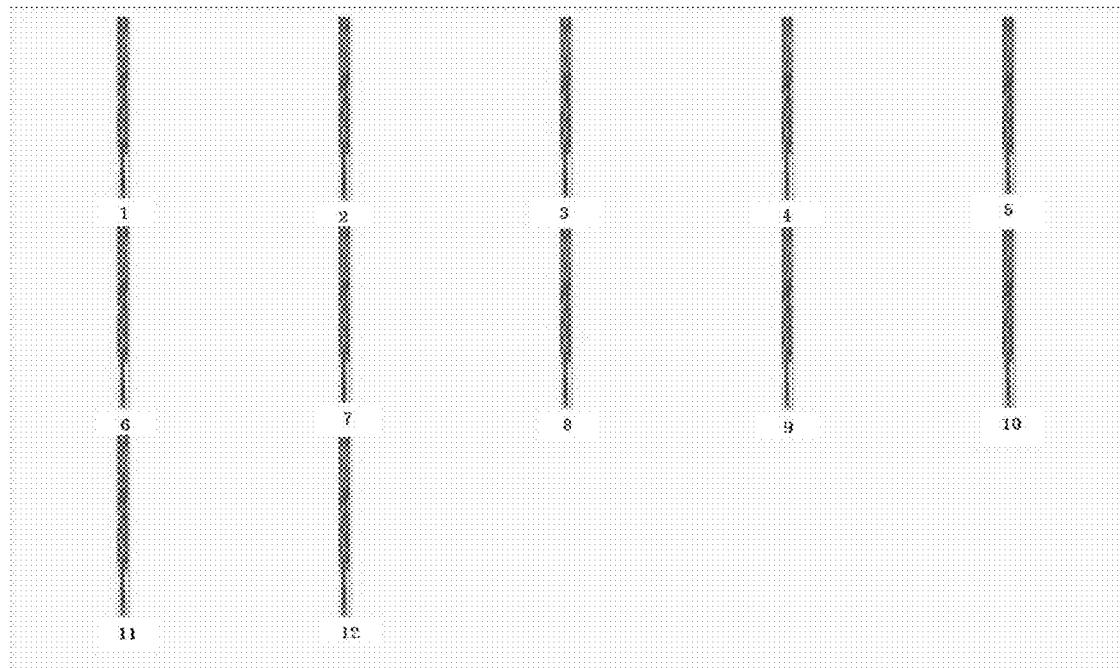
FIG. 11 is a multi-view angle image after adjustment.

The image spaced scanning module 4 is used to adjust the multi-view angle image created upfront and form a mixed image, and includes an image adjustment module 41, contrast adjustment module 42, image interlacing module 43 and mixed image output module 44. FIG. 8 is a process of forming mixed image. The system can enhance the quality of the final mixed image. In order to enhance the quality of the final mixed image, the system will first adjust each image to a suitable width. The image adjustment module 41 is used to adjust the size of the multi-view angle image. Taking the aforementioned 12 images as an example, the image finally printed is 600 pixel width per inch of the image. As there are 12 images, each image per inch is adjusted to 600/12=50 pixel width per inch. The image after adjustment and original image possess the same height. As FIG. 11 illustrates, the 12 images after adjustment and the original image possess the same height, but possess different width. Subsequently, the system will increase the contrast of these adjusted images. The contrast adjustment module 42 is used to adjust the contrast. These two processes can emphasize the color details of the final mixed image.

Figure 12:
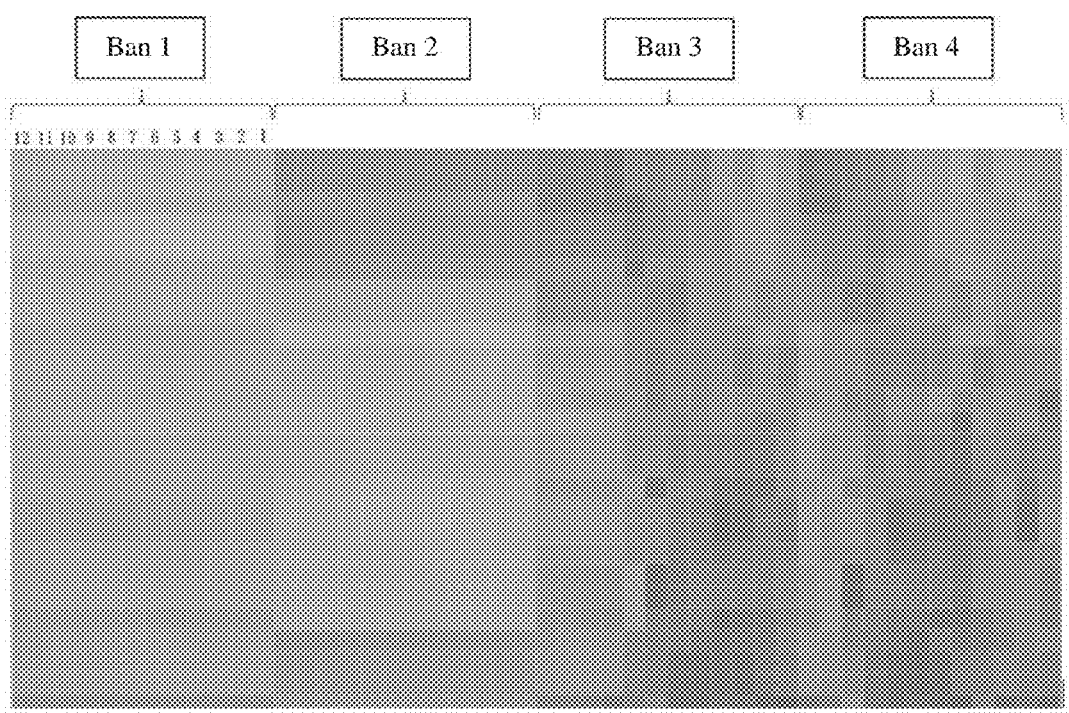
FIG. 12 is an illustrative view of a mixed image.

The final image formed is a mixed image of the 12 images. The image interlacing module 43 is used to form a mixed image. In the embodiment, the image is reconstructed at 600 pixel per inch. In order to fit with the lenticular lens of 50 LPI, the mixed image includes 600/12=50 bans per inch. Each ban contains 12 pixels. FIG. 12 is an illustrative view of a mixed ban of the image. The pixels are extracted from 12 images in the order from 12 to 1. Normally, the right eye view image is the first row of these bans, that is, the $12^{th}$ image. In FIG. 12, the first ban is a combination of the first row of each image, and so on. The second ban is a combination of the second row of each image.

In reality, most lenticular lens do not possess the ideal line per inch (LPI) value. For example, sometimes the LPI is 50.1 or 49.9 instead of 50. This will lead to distortion of the final 3D image. Therefore, the system will finally adjust the scale of the image to fit the actual lenticular lens. For example, under an ideal situation, the LPI of the lenticular lens is 50 and the width is 10 inches. The width of the image is 50×12×10=6000. Yet if the LPI of the lenticular lens is 50.1 and the width is 10 inches. The width of the final image is 5988. This can be calculated from the following equation:

$$Width_{actual} = \frac{LPI_{ideal}}{LPI_{actual}} \times Width_{ideal}$$

Wherein $LPI_{ideal}$ is the LPI of the lenticular lens at the ideal situation. In such embodiment, the value is 50. $LPI_{actual}$ is the actual LPI of the lenticular lens. In such embodiment, the value is 50.1. $Width_{ideal}$ is the ideal width under the situation of having a 50 LPI of the image, which is 6000. $Width_{actual}$ is the actual width under the situation of having a 50.1 LPI of the image, which is 5988. The mixed image output module 44 is used to form a mixed image.

The mixed image can combine with the lenticular lens to form a 3D photo. There are different methods to realize it. The image can directly be printed on the lenticular lens. The printed image can also be laminated on the lenticular lens, or be placed inside the lenticular lens frame. It is also possible to combine the mixed image with the lenticular lens via other suitable methods.

The 3D photo creation system and method of the present application outstandingly simplified the process of 3D photo creation and enhanced the quality of 3D photo. The 3D photo creation system and method of the present application utilize stereo images as input. The currently available 3D photo camera and 3D lens can be used as the shooting device of the stereo image. The application of image processing technology can reconstruct 3D information from the stereo image and the quality of the 3D photo can be enhanced. This can very quickly and efficiently create multi-view angle images and enhance the quality of the image created. In order to further enhance the quality of the mixed image, the 3D photo creation system and method of the present application would first adjust the size of the multi-view angle image. This will emphasize the color details of the mixed image outputted. The 3D photo creation system and method of the present application can be widely used in various theme parks, tourists attraction spots and photo galleries, and bring about pleasure to more consumers with the 3D photos.

The above is a description of the embodiments of the present application with reference to the drawings. However, the present application is not limited to the above specific embodiments. The above specific embodiments are merely illustrative, rather than limitative, in nature. The skilled in the art, under the inspiration of the present application and without departing from the purpose of the present application and the protection scope of the claims, can also perform many forms. These all belong within the protection scope of the present application.

What is claimed is:

1. A 3D photo creation system, comprising:
    (a) a stereo image input module configured to input a stereo image; wherein the stereo image comprises a left eye image and a right eye image;
    (b) a depth estimation module configured to estimate a depth information of the stereo image and create a depthmap;
    (c) a multi-view angle image reconstructing module configured to create a set of multi-view angle images comprising a plurality of images having different disparities according to the depthmap and the stereo image; and
    (d) an image spaced scanning module configured to adjust the set of multi-view angle images and form a mixed image;
    wherein a scale of the mixed image is adjusted and the scale is calculated by an equation $Width_{actual} = LPI_{ideal}/LPI_{actual} \times Width_{ideal}$ where the $LPI_{ideal}$ is a line per inch of a lenticular lens at an ideal situation, the $LPI_{actual}$ is an actual line per inch of the lenticular lens; the $Width_{ideal}$ is an ideal width of the lenticular lens, and the $Width_{actual}$ is an actual width of the lenticular lens;
    the image spaced scanning module comprising:
    (d1) an image adjusting module configured to adjust a size of the set of multi-view angle images;
    (d2) a contrast adjusting module configured to adjust a contrast ratio of the adjusted set of multi-view angle images outputted by the image adjusting module;
    (d3) an image interlacing module configured to combine the set of multi-view angle images after the contrast adjustment into a mixed image; and
    (d4) a mixed image output module configured to output the mixed image.

2. The 3D photo creation system according to claim 1, wherein the depth estimation module comprising:
    (b1) a pixel matching module configured to compare the left eye image and the right eye image of the stereo image and find a matching pixel between the left eye image and the right eye image, and find an optical flow of the pixel according to an optical flow constraint formula;
    (b2) a depth information confirmation module configured to find a pixel shifting according to the optical flow of the left eye image and the right eye image to confirm the depth information of the pixel; and (b3) a depthmap creation module configured to create the depthmap according to the depth information.

3. The 3D photo creation system according to claim 2, wherein the optical flow of the pixel is determined by a coarse-to-fine strategy.

4. The 3D photo creation system according to claim 1, wherein the multi-view angle image reconstructing module comprising:
   (c1) a base image selection module configured to select the left eye image, the right eye image or the left eye image and the right eye image of the stereo image as a base image;
   (c2) an image number confirmation module configured to confirm a number and disparity of a required image according to demand;
   (c3) a pixel shifting module configured to shift pixels of the base image according to the depthmap to form a new image;
   (c4) a hole filling module configured to fill holes formed from a loss of pixels in the new image; and
   (c5) a multi-view angle image creation module configured to create the set of multi-view angle images.

5. The 3D photo creation system according to claim 4, wherein the hole filling module applies the interpolation method to fill the holes formed from the loss of pixels in the new image.

6. The 3D photo creation system according to claim 4, wherein the number of the required image is determined by an equation N=DPI/LPI, where the DPI is a dot per inch of a printer, and the LPI is a line per inch of a lenticular lens.

7. The 3D photo creation system according to claim 1, wherein a foreground scene and a background scene are separated in the depthmap, the pixel at a depth value ranging within 99 to 255 represents the foreground scene and the pixel at the depth value ranging within 0 to 128 represents the background scene.

8. A 3D photo creation method, wherein comprising the following steps:
   S1) inputting a stereo image; wherein the stereo image comprises a left eye image and a right eye image;
   S2) estimating a depth information of the stereo image and creating a depthmap;
   S3) creating a set of multi-view angle images comprising a plurality of images having different disparities according to the depthmap and the stereo image; and
   S4) adjusting the set of multi-view angle images to form a mixed image;
   wherein a scale of the mixed image is adjusted and the scale is calculated by an equation $$\text{Width}_{actual} = \text{LPI}_{ideal}/\text{LPI}_{actual} \times \text{Width}_{ideal}$$

where the $\text{LPI}_{ideal}$ is a line per inch of a lenticular lens at an ideal situation, the $\text{LPI}_{actual}$ is an actual line per inch of the lenticular lens; the $\text{Width}_{ideal}$ is an ideal width of the lenticular lens, and the $\text{Width}_{actual}$ is an actual width of the lenticular lens;
   the step S4 comprising:
   S41) adjusting a size of the set of multi-view angle images;
   S42) adjusting a contrast ratio of the set of multi-view angle images adjusted by the step S41;
   S43) combining the set of multi-view angle images after the contrast adjustment and forming a mixed image;
   S44) outputting the mixed image.

9. The 3D photo creation method according to claim 8, wherein the step S2 comprising the following steps:

S21) comparing the left eye image and the right eye image of the stereo image and finding a matching pixel between the left eye image and the right eye image, and calculating an optical flow of the pixel according to an optical flow constraint formula;
   S22) finding a shifting of the pixel according to the optical flow of the left eye image and the right eye image to confirm the depth information of the pixel; and
   S23) creating the depthmap according to the depth information.

10. The 3D photo creation method according to claim 9, wherein the optical flow of the pixel is determined by a coarse-to-fine strategy.

11. The 3D photo creation method according to claim 8, wherein the step S3 comprising:
    S31) selecting the left eye image, the right eye image or the left eye image and the right eye image of the stereo image as a base image;
    S32) confirming a number and disparity of a required image according to demand;
    S33) shifting pixels of the base image according to the depthmap to form a new image;
    S34) filling holes formed from a loss of pixels in the new image; and
    S35) creating the set of multi-view angle images.

12. The 3D photo creation method according to claim 11, wherein the step 34 applies interpolation method to fill the holes formed from the loss of pixel in the new image.

13. The 3D photo creation method according to claim 11, wherein the number of the required image is determined by an equation N=DPI/LPI, where the DPI is a dot per inch of a printer, and the LPI is a line per inch of a lenticular lens.

14. The 3D photo creation method according to claim 8, wherein a foreground scene and a background scene are separated in the depthmap, the pixel having a depth value ranging within 99 to 255 represents the foreground scene and the pixel having the depth value ranging within 0 to 128 represents the background scene.

15. A 3D photo creation system, comprising:
    (a) a stereo image input module configured to input a stereo image; wherein the stereo image comprises a left eye image and a right eye image;
    (b) a depth estimation module configured to estimate a depth information of the stereo image and create a depthmap;
    (c) a multi-view angle image reconstructing module configured to create a multi-view angle image according to the depthmap and the stereo image; and
    (d) an image spaced scanning module configured to adjust the multi-view angle image and form a mixed image;
    wherein the multi-view angle image reconstructing module comprising:
    (c1) a base image selection module configured to select the left eye image, the right eye image or the left eye image and the right eye image of the stereo image as a base image;
    (c2) an image number confirmation module configured to confirm a number and disparity of a required image according to demand;
    (c3) a pixel shifting module configured to shift pixels of the base image according to the depthmap to form a new image;
    (c4) a hole filling module configured to fill holes formed from a loss of pixels in the new image; and
    (c5) a multi-view angle image creation module configured to create the multi-view angle image;

wherein a scale of the mixed image is adjusted and the scale is calculated by an equation $$Width_{actual} = LPI_{ideal}/LPI_{actual} \times Width_{ideal}$$

Where the $LPI_{ideal}$ is a p r inch of a lenticular lens at an ideal situation, the $LPI_{actual}$ is an actual line per inch of the lenticular lens; the $Width_{ideal}$ is an ideal width of the lenticular lens, and the $Width_{actual}$ is an actual width of the lenticular lens.

* * * * *